United States Patent [19]
Noya

[11] Patent Number: 5,419,367
[45] Date of Patent: May 30, 1995

[54] SOLENOID VALVE

[75] Inventor: Tamotsu Noya, Ibaraki, Japan

[73] Assignee: Kyosan Denki Co., Ltd., Tokyo, Japan

[21] Appl. No.: 246,359

[22] Filed: May 19, 1994

[30] Foreign Application Priority Data

May 21, 1993 [JP] Japan ................... 5-141315

[51] Int. Cl.$^6$ ................ F16K 31/10; F16K 31/365
[52] U.S. Cl. ................ 137/495; 251/129.17
[58] Field of Search ............ 137/495; 251/129.03, 251/129.17

[56] References Cited

U.S. PATENT DOCUMENTS

| | | | |
|---|---|---|---|
| 3,017,156 | 1/1962 | Lemberger | 251/129.03 X |
| 3,429,552 | 2/1969 | Huley et al. | 251/129.17 |
| 3,446,471 | 5/1969 | Westphal | 251/129.17 X |
| 3,743,240 | 7/1973 | Merriner | 251/129.17 |
| 3,994,356 | 11/1976 | Smitley | 137/495 |

Primary Examiner—Stephen M. Hepperle
Attorney, Agent, or Firm—Flynn, Thiel, Boutell & Tanis

[57] ABSTRACT

In a solenoid valve comprising a first solenoid valve for regulating pressure and a second multifunctional solenoid valve integrated with the first solenoid valve, even if a solenoid of the first solenoid valve is energized, a diaphragm valve of the solenoid valve is not immediately opened, thereby providing a safe and compact solenoid valve. The first solenoid valve comprises a first spring provided between the upper end of a plunger which is movable by the solenoid and a stator, while the lower end of the plunger is disposed to be brought into contact with the diaphragm valve and a second spring is provided for urging the diaphragm valve in the direction to close it even if the plunger is moved away from the diaphragm valve and the second solenoid valve which is integrated with said solenoid valve for controlling to selectively open or close a closing valve and a one way valve.

2 Claims, 3 Drawing Sheets

SOLENOID VALVE

BACKGROUND OF THE INVENTION

1. Field of the Invention

The present invention relates to a solenoid valve having pressure regulating function and comprising first and second connecting passages and a diaphragm valve which is controlled to keep the pressure in the side of one of the passages under a given pressure and a second multifunctional solenoid valve integrated with the first solenoid valve.

2. Prior Art

There has been employed a pressure regulating solenoid valve having a first connecting passage 31 connected to a fuel tank side and a second connecting passage 32 connected to an intake manifold side and a diaphragm valve 33 for permitting both the first and second connecting passages 31, 32 to communicate with each other, wherein the solenoid valve controls the diaphragm valve 33. The diaphragm valve 33 is moved upward, namely, the diaphragm valve 33 is released from the closing of the communication between the first and second connecting passages 31 and 32 so that the first and second connecting passages 31 and 32 are permitted to communicate with each other when a plunger 35 is pulled upward at the time when the power is turned on to energize a solenoid 34.

There is provided a stator 36 above the plunger 35 for restricting the upward movement of the plunger 35 and also provided a stopper 37 formed of molded rubber or nonmagnetic material and attached to the stator 36 for buffering shock of the plunger 35 which is generated when the plunger 35 strikes against the stator 36.

A spring 38 is provided between the stator 36 and the upper end of the plunger 35. The diaphragm valve 33 is also provided with a check valve 39.

When the solenoid 34 is de-energized, the diaphragm valve 33 is closed by the weight of the plunger 35 and resiliency of the spring 38. When the inner pressure of the fuel tank reaches a given positive pressure, the diaphragm valve 33 is pushed upward so that the pressure is let off to keep the inner pressure of the fuel tank under the given pressure. On the other hand, when the inner pressure of the fuel tank reaches a negative pressure, atmosphere is introduced into the fuel tank from the intake manifold side by way of the check valve 39 so as to permit the inner pressure of the fuel tank to equal the atmosphere.

When the solenoid 34 is energized, the diaphragm valve 33 is open against the weight of the plunger 35 and the resiliency of the spring 38 so as to permit the first connecting passage 31 and the second connecting passage 32 to communicate with each other. As a result, evaporated fuel in the fuel tank is supplied to the intake manifold so as to permit the inner pressure of the fuel tank to be lower than that in the case where the solenoid 34 is de-energized. In case of the negative inner pressure in the fuel tank, the atmosphere is introduced into the fuel tank when the intake manifold side is in the positive pressure but the atmosphere can not be introduced into the fuel tank when the intake manifold side is in the positive pressure. Accordingly, an atmosphere introduction valve is provided in the fuel tank as shown in FIG. 6. The atmosphere introduction valve comprises an atmosphere passage 40, a check valve 41 and a closing valve 43 which is closable by a solenoid 42 of the solenoid valve.

However, there are following problems in the prior art solenoid valve.

(a) Since the plunger 35 is directly connected to the diaphragm valve 33, the diaphragm valve 33 is immediately opened when the solenoid 34 is energized. Accordingly, when an atmosphere opening passage of the canister which is open to the atmosphere is clogged or resistance therethrough is large, the negative pressure in the intake manifold is introduced into the second connecting passage 32, then passes through the diaphragm valve 33 and the first connecting passage 31, whereby the fuel tank is negatively pressurized to apply stress in the fuel tank. As a result, there is a likelihood of breakage of the fuel tank.

(b) Since the stopper 37 formed of the rubber or the nonmagnetic material is attached to the stator 36 by way of sticking of the stopper 37 to the stator 36, if the stopper 37 is detached from the stator 36, the plunger 35 is prevented from being slid. As a result, there is a likelihood that the solenoid valve is prevented from working normally.

(c) Since the pressure regulating solenoid valve and the atmosphere introduction valve are separately provided, both valves need individual spaces for attachment thereof.

(d) Since the evaporated fuel generated in the fuel tank is condensed in the first and second connecting passages 31 and 32 and liquefied therein, there is a likelihood that the valve performance is changed or the evaporated fuel leaks outside, which causes a fire.

SUMMARY OF THE INVENTION

The present invention has been made in view of the problems of the prior art solenoid valve. It is an object of the present invention to provide the solenoid valve which is safe and compact since a diaphragm valve is not immediately opened even if the pressure regulating solenoid valve is energized.

It is another object of the invention to provide a solenoid valve comprising two solenoid valves which are integrated with each other to thereby make the solenoid valve compact.

To achieve the above objects, the solenoid valve according to a first aspect of the invention comprises a first connecting passage connected to a fuel tank side, a second connecting passage connected to an intake manifold side, a diaphragm valve for permitting both the first and second connecting passages to communicate with each other, a solenoid body having a solenoid, a plunger and a stator wherein the plunger vertically movable by the solenoid and the stator is disposed above the plunger, a first spring disposed between the upper end of the plunger and the stator wherein the lower end of the plunger is disposed to be able to contact with the diaphragm valve, and a second spring disposed between the diaphragm valve and the solenoid body for urging the diaphragm valve in the direction to close it in the state where the plunger is moved away from the diaphragm valve.

A solenoid valve according to a second aspect of the invention is characterized in that there are provided in the first aspect of the invention a hole or groove defined vertically in the stator and a stopper formed by mold of the nonmagnetic material provided in the hole or groove for stopping the plunger.

A solenoid valve according to a third aspect of the invention is characterized in that there are provided in the first aspect of the invention a solenoid valve for adjusting pressure between the first and second connecting passages, a bypass passage between the first and second connecting passages, a one way directional valve (hereinafter referred to as one way valve) between the bypass passage and a third connecting passage, a closing valve between the bypass passage and the second connecting passage and a second solenoid valve which is integrated with the first solenoid valve for controlling to selectively open or close the closing valve and the one way valve.

A solenoid valve according to a fourth aspect of the invention in characterized in that the third connecting passage serves as an atmosphere passage, the one way valve serves as an atmosphere introduction valve, and the closing valve serves as a negative pressure introduction valve.

A solenoid valve according to a fifth aspect of the invention is characterized in that there is provided an evaporation device for evaporating liquefied material due to capillarity in the second solenoid valve, the first connecting passage or the second connecting passage in the third aspect of the invention.

With the arrangements of the invention, when the solenoid is de-energized, the diaphragm valve is closed by the weight of the plunger and resiliency of the first spring. When the inner pressure of the fuel tank reaches a given positive pressure, the diaphragm valve is pushed upward so that the pressure is let off to the second connecting passage to keep the inner pressure of the fuel tank under the given pressure. On the other hand, even at the state where the solenoid is energized, the plunger is moved upward but the diaphragm valve is kept closed due to the presence of the second spring for urging the diaphragm valve in the direction to close it. However, when the inner pressure in the first connecting passage side is exceeds the resiliency of the second spring, the diaphragm valve is pushed upward so that the pressure is let off in the direction of the second connecting passage side so as to keep the first connecting passage side under the give pressure. Accordingly, even if the plunger moves upward, the negative pressure does not influence upon the first connecting passage through the second connecting passage side to the diaphragm valve.

In the second aspect of the invention, when the plunger is moved upward by the energization of the solenoid, the stopper is hardly detached from the stator when the plunger strikes against the stopper since the stopper formed of nonmagnetic material and provided in the stator is molded, In the third aspect of the invention, since there are provided the one way valve between the bypass passage and the third connecting passage, the closing valve between the bypass passage and second connecting passage and the second solenoid valve for selectively controlling to open or close the closing valve and the one way valve wherein the second solenoid valve is integrated with the first solenoid valve for regulating the pressure, the fluid from the third connecting passage passes through the bypass passage by way of the one way valve and it is introduced into the first connecting passage when the one way valve is opened and the closing valve is closed by the second solenoid valve while the fluid from the second connecting passage passes through the bypass passage by way of the closing valve and is introduced into the first connecting passage when the closing valve is opened and the one way valve is closed by the second solenoid valve. Furthermore, since the first solenoid valve and the second solenoid valve is integrated with each other, the space for the first and second solenoid valves are reduced as a whole.

In the fourth aspect of the invention, since the third connecting passage serves as the atmosphere introduction passage and the one way valve serves as the atmospheric introduction valve and the closing valve serves as the negative pressure introduction valve, when the atmosphere introduction valve is opened and the negative pressure introduction valve is closed by the second solenoid valve, the atmosphere from the atmosphere passage passes through the bypass passage by way of the atmosphere introduction valve and is introduced into the first connecting passage and when the negative pressure introduction valve is opened and the atmosphere introduction valve is closed by the second solenoid valve, the negative pressure from the second connecting passage passes through the bypass passage by way of the negative pressure introduction valve and is introduced into the first connecting passage.

In the fifth aspect of the invention, since the evaporating devices are provided at the second solenoid valve or the first or second connecting passage where the evaporative material is liable to liquefy and to stay, liquefied and stayed evaporative material are divided into small particles by capillarity and positively reevaporated and is introduced into the second connecting passage.

PREFERRED EMBODIMENT OF THE INVENTION

A solenoid valve to be disposed between a fuel tank of an automobile and an intake manifold will be described with reference to FIGS. 1 to 4.

Figure 4:
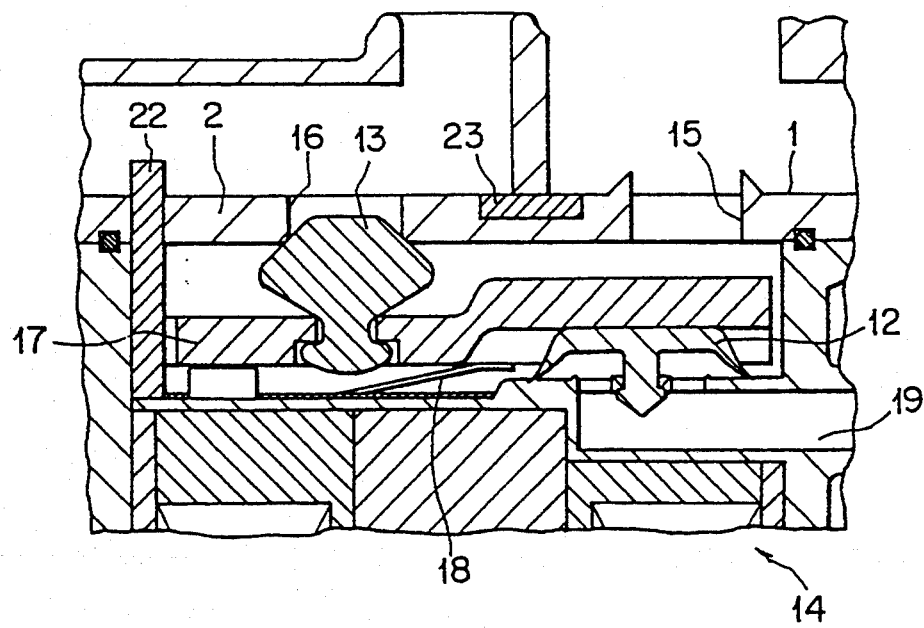
FIG. 4 is an enlarged cross-sectional view showing another operation of a second solenoid valve in FIG. 1.
Figure 5:
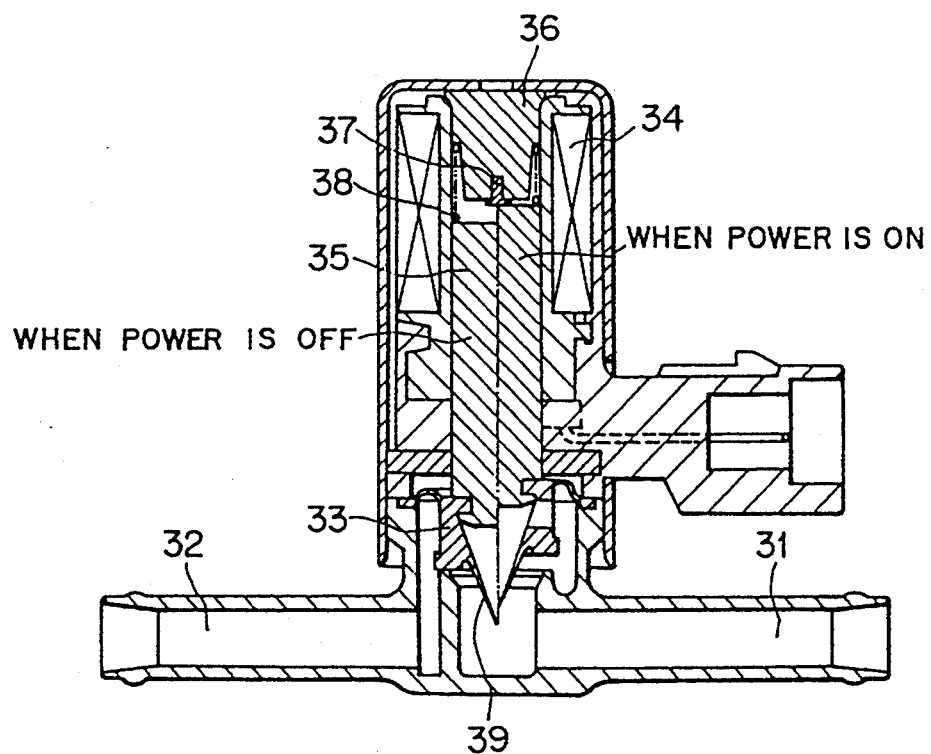
FIG. 5 is a cross-sectional view of a prior art solenoid valve.
Figure 6:
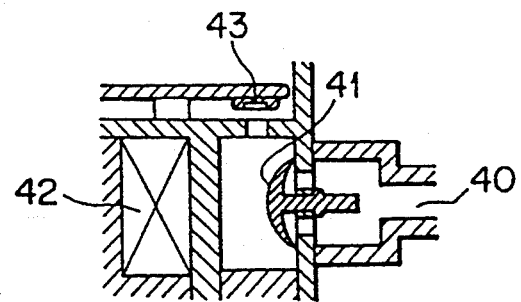
FIG. 6 is a cross-sectional view of an atmosphere introduction valve in FIG. 5.

In FIG. 4, denoted at 1 is a first connecting passage to be connected to a side of a fuel tank, not shown, 2 is a second connecting passage to be connected to an intake manifold side and both the first connecting passage 1 and the second connecting passage 2 are opened or closed by a diaphragm valve 3. Denoted at 4 is a solenoid of a solenoid valve for adjusting pressure. If the solenoid 4 is energized, a plunger 5 is pulled upward.

There is provided a stator 6 above the plunger 5 for restricting the upward movement of the plunger 5 and also provided a stopper 7 formed of molded rubber or nonmagnetic material and attached to the stator 6 for buffering shock of the plunger 5 which is generated when the plunger 5 strikes against the stator 6. There is provided second spring 10 between the diaphragm valve 3 and a body 9.

When the solenoid 4 is de-energized, the diaphragm valve 3 is closed by the weight of the plunger 5 and the resiliency of both the first and second springs 8 and 10. When the inner pressure of the fuel tank reaches a given positive pressure, it exceeds the strength of the weight of the plunger 5 and the resiliency of both the springs 8 and 10 so that the pressure in the fuel tank is let off in the direction of the intake manifold side so as to keep the inner pressure under the given pressure.

When the solenoid 4 is energized, the plunger 5 is moved away from the diaphragm valve 3 and brought into contact with the stopper 7 while the diaphragm valve 3 is kept closed due to the presence of the second spring 10 for urging it to close. When the inner pressure of the fuel tank exceeds the resiliency of the second spring 10, it pushes the diaphragm valve 3 upward so as to let off the pressure in the fuel tank in the direction of the intake manifold side so that the inner pressure is kept under the given pressure.

Figure 2:
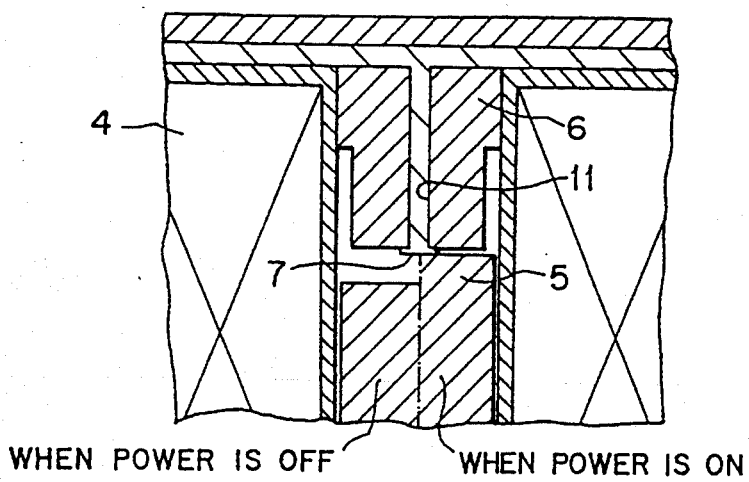
FIG. 2 is an enlarged cross-sectional view of a stator of the solenoid valve in FIG. 1.

As is evident from the enlarged view in FIG. 2, there is provided a hole or groove 11 extending vertically in the stator 6. There is provided the stopper 7 which is formed of molded nonmagnetic material in the hole or groove 11 and serves as a stopper of the plunger 5. The stopper 7 is hardly detached from the hole or groove 11 when the plunger 5 strikes against the stopper 7 so that the plunger 5 is not prevented from sliding, and hence the solenoid valve performs its function.

Figure 1:
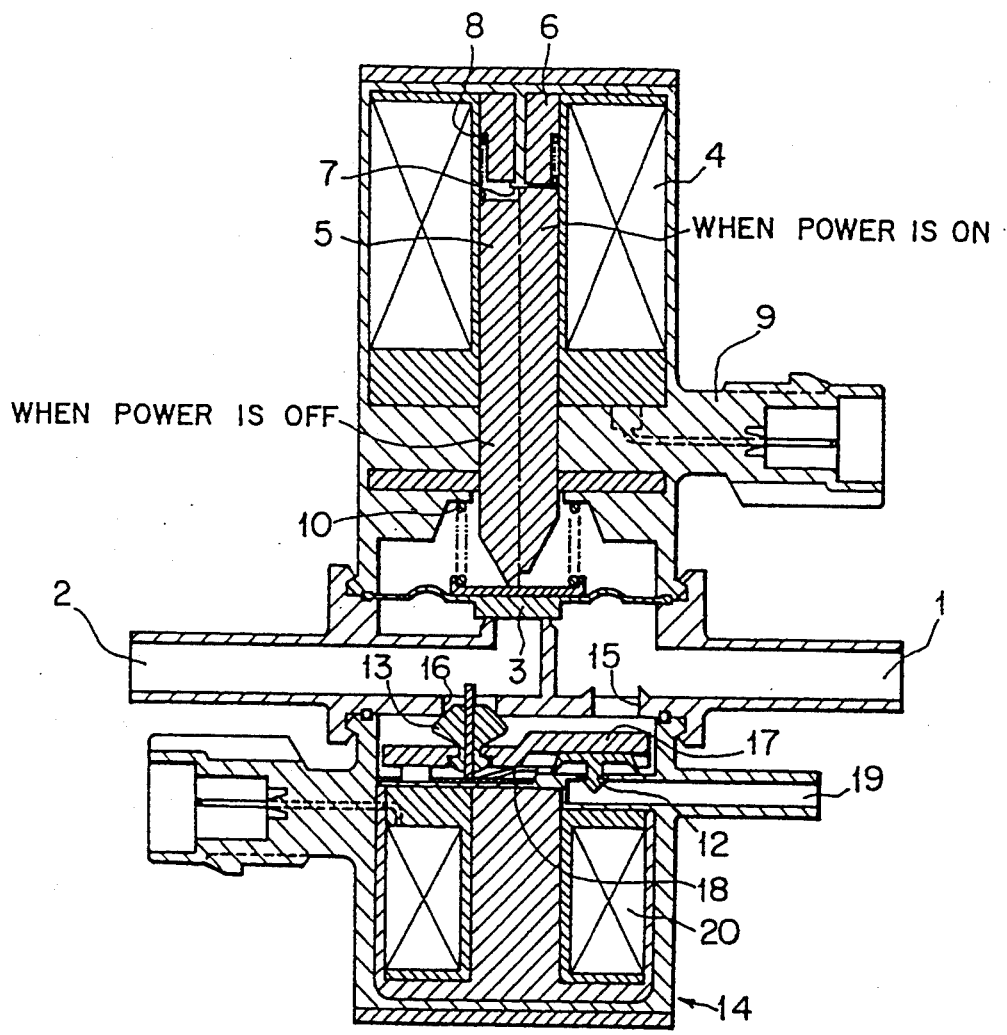
FIG. 1 is a cross-sectional view of a solenoid valve according to a preferred embodiment of the invention.

In FIG. 1, there is illustrated a second solenoid valve 14 which is integrated with a solenoid valve for selectively controlling to open or close an atmosphere introduction valve serving as a one way valve for introducing atmosphere into a fuel tanks side and a negative pressure introduction valve 13 serving as a closing valve for introducing negative pressure from the intake manifold side. That is, there are provided an opening 15 in the first connecting passage i and an opening 16 in the second connecting passage 2 which form the negative pressure introduction valve 13. The negative pressure introduction valve 13 is attached to a movable plate 17. Since the movable plate 17 is always urged upward by a third spring 18 so that the negative pressure introduction valve 13 always closes the opening 16. Denoted at 19 is a third connecting passage, for example, serving as an atmosphere side passage which is open to the atmosphere at one end and to the one way valve 12 at the other end. The one way valve 12 is disposed immediately under the movable plate 17. Denoted at 20 is a solenoid for vertically moving the movable plate 17.

As illustrated in FIG. 1, when the solenoid 20 is not energized, the movable plate 17 is urged upward by the third spring 18 and the negative pressure introduction valve 13 closes the opening 16 while the one way valve 12 is ready to introduce the atmosphere from the third connecting passage 19 into the opening 15. In this state, the inner pressure in the fuel tank is prevented from being negatively pressurized since the atmosphere from the third connecting passage 19 passes through the one way valve 12, the opening 15 and the first connecting passage 1 and it is introduced into the fuel tank.

The solenoid 20 is energized so as to introduce the negative pressure in the intake manifold from the bypass passage into the fuel tank by way of the second solenoid valve 14 for diagnosing the trouble in a purging system. When the solenoid 20 is energized, the movable plate 17 is moved downward against the urging force of the third spring 18. When the movable plate 17 is moved downward, the negative pressure introduction valve 13 is moved away from the opening 16 to pen the opening 16 while the one way valve 12 is closed to prevent the atmosphere from passing therethrough. Accordingly, when the intake manifold side is negatively pressurized for diagnosing the trouble in the purging system, the negative pressure in introduced into the fuel tank through the second connecting passage 2, the opening 16, the bypass passage, the opening 15 and the first connecting passage 1 to thereby permit the inside of the fuel tank to keep under the negative pressure. At this time, the atmosphere is not introduced into the fuel tank since the one way valve 12 is closed.

Figure 3:
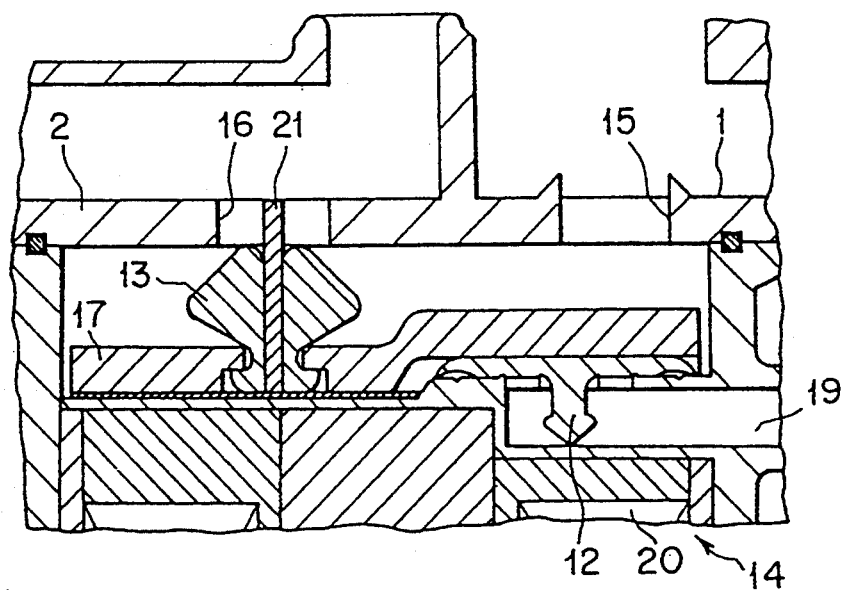
FIG. 3 is an enlarged cross-sectional view showing an operation of a second solenoid valve in FIG. 1.

Since the evaporative emission is liable to stay in the first connecting passage 1, second connecting passage 2 or the second solenoid valve 14, such stayed evaporative emission can be divided into more small particles by capillarity and is positively reevaporated and is introduced into the intake manifold if there are provided evaporating devices 21, 22 and 23 formed of filter paper or fiber, etc. in the negative pressure introduction valve 13 in FIG. 3 or a corner of the second solenoid valve 14 or in the first connecting passage 1 or second connecting passage 2 in FIG. 4.

The solenoid valve of the present invention can be also used for controlling the inner pressure of a fuel tank for storing volatile liquid therein.

There are following advantages in the present invention.

Since the first spring is provided between the upper end of the plunger which is movable by the solenoid and the stator, while the lower end of the plunger is disposed to be brought into contact with the diaphragm valve and the second spring is provided for urging the diaphragm valve in the direction to close the diaphragm valve, even if the plunger is moved away from the diaphragm valve, it is possible to provide the safe and compact solenoid valve capable of permitting the controlled side to keep under the given positive pressure without influencing the negative pressure generated in one of the connecting passages upon the controlled side even if the plunger is moved away from the diaphragm valve.

Since the stopper formed of nonmagnetic material and provided in the stator is molded, it is hardly detached from the stator, it is possible to provide a safe valve capable of performing a normal valve function without obstructing the sliding motion of the plunger.

Since there are provided the one way valve between the bypass passage and the third connecting passage, the closing valve between the bypass passage and second connecting passage and the second solenoid valve for selectively controlling to open or close the closing valve and the one way valve wherein the second solenoid valve having different function of the first solenoid valve is integrated with the solenoid valve for regulating the pressure, and hence the space for the first and second solenoid valves are reduced as a whole to thereby make the solenoid valve compact.

Since the third connecting passage serves as the atmosphere introduction passage and the one way valve serves as the atmospheric introduction valve and the closing valve serves as the negative pressure introduction valve, the atmosphere can be introduced without providing additional solenoid for introducing atmosphere valve to prevent the first connecting passage to be controlled from being negatively pressurized while the negative pressure can be introduced into the controlled side by way of the second solenoid valve when the controlled side is needed to be negatively pressurized for diagnosing the trouble in the purging system, whereby the multifuctional compact solenoid valve can be provided.

Since the evaporating devices are provided at the second solenoid valve or the first or second connecting passage where the evaporative material is liable to liquefy and to stay, liquefied and stayed evaporative material are divided into small particles by capillarity and positively reevaporated and is introduced into the second connecting passage, the valve performance is not changed and the liquefied material is not liable to seep outside to thereby provide the safe solenoid valve.

What is claimed is:

1. A solenoid valve comprising:
    a first connecting passage connected to a fuel tank side;
    a second connecting passage connected to an intake manifold side;
    a diaphragm valve for permitting both the first and second connecting passages to communicate with each other;
    a solenoid body having a solenoid, a plunger and a stator wherein said plunger vertically movable by said solenoid and said stator is disposed above said plunger;
    a first spring disposed between the upper end of said plunger and said stator wherein the lower end of said plunger is disposed to be able to contact with said diaphragm valve; and
    a second spring disposed between said diaphragm valve and said solenoid body for urging said diaphragm valve in the direction to close it in the state where said plunger is moved away from said diaphragm valve.

2. A solenoid valve according to claim 1, wherein hole or groove are provided vertically in said stator and a stopper formed by mold of the nonmagnetic material provided in said hole or groove for stopping said plunger.

* * * * *